United States Patent [19]

Matsuura et al.

[11] Patent Number: 5,356,708
[45] Date of Patent: Oct. 18, 1994

[54] INSULATED WIRE

[75] Inventors: Yuki Matsuura; Isao Ueoka; Koichi Iwata, all of Osaka, Japan

[73] Assignee: Sumitomo Electric Industries, Ltd., Osaka, Japan

[21] Appl. No.: 978,975

[22] Filed: Nov. 23, 1992

[30] Foreign Application Priority Data

| Nov. 22, 1991 | [JP] | Japan | 3-307574 |
| Jun. 18, 1992 | [JP] | Japan | 4-159384 |
| Jul. 20, 1992 | [JP] | Japan | 4-192360 |

[51] Int. Cl.$^5$ .............................................. H01B 3/18
[52] U.S. Cl. ................................ 428/375; 428/379; 428/380; 428/383; 428/458; 174/110 SR; 174/120 SR; 528/67; 528/73; 528/84
[58] Field of Search ................... 528/67, 73, 84; 428/375, 379, 380, 383, 458; 174/110 SR, 110 N, 120 SR

[56] References Cited

U.S. PATENT DOCUMENTS

| 3,541,038 | 11/1970 | Nakano et al. | 260/30.6 |
| 4,350,738 | 9/1982 | Saunders et al. | 428/383 |
| 4,408,032 | 10/1983 | Sollner et al. | 528/48 |
| 4,477,624 | 10/1984 | Waki | 524/736 |
| 4,693,936 | 9/1987 | McGregor et al. | 428/383 |
| 5,086,154 | 2/1992 | Camberlin et al. | 528/73 |
| 5,157,097 | 10/1992 | Takayanagi et al. | 528/51 |
| 5,171,828 | 12/1992 | Meterko et al. | 528/353 |

FOREIGN PATENT DOCUMENTS

| 2009626 | 3/1970 | Fed. Rep. of Germany . |
| 2039448 | 8/1970 | Fed. Rep. of Germany . |
| 4419274 | 8/1969 | Japan . |
| 4527611 | 9/1970 | Japan . |
| 2016487 | 2/1979 | United Kingdom . |
| 2103633 | 4/1982 | United Kingdom . |

OTHER PUBLICATIONS

Patent Abstracts of Japan, vol. 15, No. 400 (M-1167) Oct. 1991 re JP-A-31 64 240.
Patent Abstracts of Japan, vol. 14, No. 526 (C-779) Nov. 1990 re JP-A-22 18 774.
Patent Abstracts of Jaspan, vol. 15, No. 341 (C-863) Aug. 1991 re JP-A-31 31 630.
Patent Abstracts of Japan, vol. 15, No. 388 (C-872) Oct. 1991 re JP-A 31 57 429.

*Primary Examiner*—Patrick J. Ryan
*Assistant Examiner*—Marie R. Macholl
*Attorney, Agent, or Firm*—Cushman, Darby & Cushman

[57] ABSTRACT

An insulated wire comprising a conductor and an insulating coating made from a polyamideimide base coating, which polyamideimide is made of an acid component and a diisocyanate component containing 10 to 80 % by mole of an aromatic diisocyanate compound of the formula:

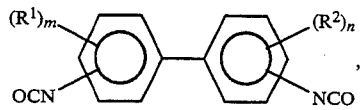

or which polyamideimide is made of an diisocyanate component and an imidodicarboxylic acid that is a reaction product of an acid component and a diamine component, in which the diamine component contains an aromatic diamine compound of the formula:

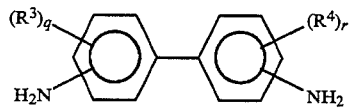

and/or the diisocyanate component contains the above aromatic diisocyanate compound in such an amount that a total amount of the aromatic diamine compound and the diisocyanate compound is from 10 to 80 % by mole based on the total amount of the whole diamine component and the whole diisocyanate component.

16 Claims, No Drawings

INSULATED WIRE

BACKGROUND OF THE INVENTION

1. Field of the Invention

The present invention relates to an insulated wire. More particularly, the present invention relates to an insulated wire which is excellent in winding and inserting properties to processing and preferably used as a wire to be wound around a core of a motor.

2. Description of the Related Art

In these years, as a tendency for down-sizing and weight reduction of electric or electronic apparatuses has increased, a smaller and lighter motor with higher performances has been required. To satisfy such requirement, it is necessary to wind more turns of an insulated wire around the core of the motor. To this end, the insulated wire is forced to be jammed in a core slot. Therefore, an insulating coating of the insulated wire tends to be damaged during winding. If the insulating coating is damaged, layer failure or earth failure occurs so that electric characteristics of the motor tend to be deteriorated.

Hitherto, in the motor to be used in the above described application, there is usually used an insulated wire having an insulating coating with good mechanical strength which is formed by coating and baking a coating paint of polyamideimide having good mechanical strength on a conductor or other insulating coating which is already formed on the conductor. As the polyamideimide, a reaction product of diphenylmethane-4,4'-diisocyanate and trimellitic anhydride is generally used (cf. Japanese Patent Publication Nos. 19274/1969 and 27611/1970).

Today, a further down-sized and weight reduced motor with better performances is required. To satisfy this requirement, the number of turns of the insulated wire is further increased so that even the polyamideimide base insulating coating is sometimes damaged.

To decrease the damage of the insulating coating, it is studied to add an organic or inorganic lubricant to the coating paint so as to impart lubricity to the insulating coating, or to apply a lubricant such as a wax directly on the insulated wire. However, these methods do not prevent the damage of the insulating coating completely.

The further increase of the mechanical strength of the insulating coating may decrease the damage of the insulating coating. However, simple increase of the mechanical strength will make the coating more stiff and less flexible, so that the coating is easily cracked or peeled off when the insulated wire is bent, or the winding and inserting properties of the insulated wire is deteriorated.

SUMMARY OF THE INVENTION

One object of the present invention is to provide an insulating coating of an electric wire which is less damaged than the conventional insulating coating.

Another object of the present invention is to provide an insulated wire having improved flexibility and winding and inserting properties.

According to a first aspect of the present invention, there is provided an insulated wire comprising a conductor and an insulating coating made from a polyamideimide base coating, which polyamideimide comprises an acid component and a diisocyanate component containing 10 to 80% by mole of an aromatic diisocyanate compound of the formula:

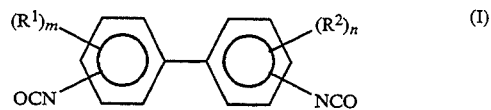

wherein $R^1$ and $R^2$ are the same or different and each a hydrogen atom, an alkyl group, an alkoxy group or a halogen atom, and m and n are the same or different and each a number of 1 to 4.

According to a second aspect of the present invention, there is provided an insulated wire comprising a conductor and an insulating coating made from a polyamideimide base coating, which polyamideimide comprises an diisocyanate component and an imidodicarboxylic acid that is a reaction product of an acid component and a diamine component, wherein said diamine component contains an aromatic diamine compound of the formula:

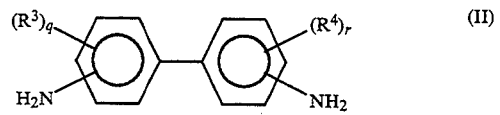

wherein $R^3$ and $R^4$ are the same or different and each a hydrogen atom, an alkyl group, an alkoxy group or a halogen atom, and q and r are the same or different and each a number of 1 to 4, and/or said diisocyanate component contains an aromatic diisocyanate compound of the formula:

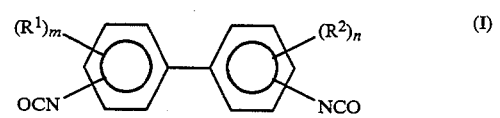

wherein $R^1$ and $R^2$ are the same or different and each a hydrogen atom, an alkyl group, an alkoxy group or a halogen atom, and m and n are the same or different and each a number of 1 to 4, in such an amount that a total amount of said aromatic diamine compound (II) and said diisocyanate compound (I) is from 10 to 80% by mole based on the total amount of the whole diamine component and the whole diisocyanate component.

DETAILED DESCRIPTION OF THE INVENTION

According to the present invention, at least one of the diisocyanate components of the polyamideimide to be contained in the coating paint is an aromatic diisocyanate of the formula (I).

As the alkyl group in the formula (I), an alkyl group having 1 to 4 carbon atoms such as methyl group, an ethyl group, a propyl group, a butyl group and the like is preferred.

As the alkoxy group, an alkoxy group having 1 to 2 carbon atoms such as a methoxy group and an ethoxy group is preferred.

As the halogen atom, a chlorine atom and a bromine atom are preferred.

Specific examples of the aromatic diisocyanate (I) are biphenyl-4,4'-diisocyanate, biphenyl-3,3'-diisocyanate, biphenyl-3,4'-diisocyanate, 3,3'-dichlorobiphenyl-4,4'-diisocyanate, 2,2'-dichlorobiphenyl-4,4'-diisocyanate, 3,3'-dibromobiphenyl -4,4'-diisocyanate, 2,2'-dibromobiphenyl-4,4'-diisocyanate, 3,3'-dimethylbiphenyl-4,4'-diisocyanate, 2,2'-dimethylbiphenyl-4,4'-diisocyanate, 2,3'-dimethylbiphenyl -4,4'-diisocyanate, 3,3'-diethylbiphenyl-4,4'-diisocyanate, 2,2'-diethylbiphenyl-4,4'-diisocyanate, 3,3'-dimethoxybiphenyl -4,4'-diisocyanate, 2,2'-dimethoxybiphenyl-4,4'-diisocyanate, 2,3'-dimethoxybiphenyl-4,4'-diisocyanate, 3,3'-diethoxybiphenyl-4,4'-diisocyanate, 2,2'-diethoxybiphenyl-4,4'-diisocyanate, 2,3'-diethoxybiphenyl-4,4'-diisocyanate, and the like. They may be used independently or as a mixture thereof.

Among the aromatic diisocyanate compound, 3,3'-dimethylbiphenyl-4,4'-diisocyanate is preferred in view of easy availability and cost.

In combination with the aromatic diisocyanate compound (I), at least one other diisocyanate compound is used. As the other diisocyanate compound, any of the conventionally used diisocyanate compounds may be used. A preferred other diisocyanate compound is represented by the formula:

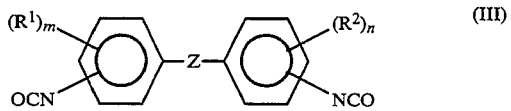

wherein $R^1$, $R^2$, m and n are the same as defined above, and Z is —$CH_2$— or —O—.

Preferred examples of the other diisocyanate compound are diphenylmethane-4,4'-diisocyanate, diphenylmethane -3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylenediisocyanate, p-xylylenediisocyanate, and the like. They may be used independently or as a mixture thereof.

Among the other isocyanate compounds, diphenylmethane -4,4'-diisocyanate is preferably used in view of easy availability and cost.

As the acid component of the polyamideimide, any of the conventionally used acids may be used. A preferred acid compound is an acid anhydride of the formula:

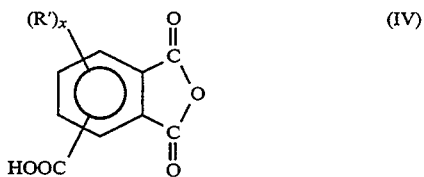

wherein R' is a hydrogen atom, an alkyl group, an alkoxy group or a halogen atom and x is a number of 1 to 3.

Preferred examples of the acid are trimellitic acid, trimellitic anhydride, trimellityl chloride or derivatives of trimellitic acid such as its tribasic acid and the like. Among them, trimellitic anhydride is preferred in view of easy availability and a cost.

In addition, the acid component may contain other acid compound such as a tetracarboxylic anhydride or a dibasic acid. Examples of the other acid compound are pyromellitic dianhydride, biphenyltetracarboxylic dianhydride, benzophenonetetracarboxylic dianhydride, diphenylsulfonetetracarboxylic dianhydride, terephthalic acid, isophthalic acid, sulfoterephthalic acid, dicitric acid, 2,5-thiophenedicarboxylic acid, 4,5-phenanthrenedicarboxylic acid, benzophenone-4,4'-dicarboxylic acid, phthaldiimidedicarboxylic acid, biphenyldicarboxylic acid, 2,6-naphthalenedicarboxylic acid, diphenylsulfone-4,4'-dicarboxylic acid, adipic acid, and the like.

The reason why the amount of the aromatic diisocyanate compound (I) is in the range from 10 to 80% by mole based on the whole amount of the diisocyanate component is as follows:

When this amount is smaller than 10% by mole, the mechanical strength of the insulating coating is not improved. When this amount exceeds 80% by mole, the insulating coating becomes brittle.

When the above amount of the aromatic diisocyanate compound (I) is from 30 to 70% by mole, abrasion resistance of the insulating coating is improved so that flaws are suppressed during wiring the insulated wire to form the coil using a winding machine. In particular, when the above amount of the aromatic diisocyanate compound (I) is from 40 to 60% by mole, the abrasion resistance is further improved and the flaws are further suppressed.

When the amount of the aromatic diisocyanate compound (I) is from 60 to 80% by mole based on the whole amount of the diisocyanate component, at least one of the acid component and the diisocyanate component contains 5 to 40% mole, preferably 10 to 30% by mole of an acid or diisocyanate compound having a crooked molecular structure.

The term "a compound having a crooked molecular structure" herein used intends to mean an aromatic difunctional compound in which two carboxyl groups or isocyanate groups are absent at p-positions of the aromatic ring, or aliphatic dicarboxylic acid or diisocyanate. Specific examples of the acid having the crooked molecular structure are isophthalic acid, orthophthalic acid, benzophenonedicarboxylic acid, 3,4'- or 3,3'-diphenylmethanedicarboxylic acid, 3,4'- or 3,3'-diphenyletherdicarboxylic acid, 3,4'-or 3,3'-diphenylsulfonedicarboxylic acid, adipic acid, sebacic acid, dodecanedicarboxylic acid, and the like. Specific examples of the diisocyanate compound having the crooked molecular structure are diphenylmethane-3,4'- or 3,3'-diisocyanate, diphenylether-3,4'- or 3,3'-diisocyanate, 2,3- or 2,4-toluenediisocyanate, hexamethylenediisocyanate, xylylenediisocyanate and the like. In addition, ε-caprolactam or ω-laurolactam may be used.

Among them, an aromatic dicarboxylic acid having no carboxyl groups at the p-positions is preferred in view of reactivity.

When the above acid or diisocyanate compound having the crooked molecular structure is used, the polyamideimide has a crooked part or parts in a polymer chain due to such compound so that the flexibility of the coating is increased.

When an amount of the compound having the crooked molecular structure is less than 5% by mole, the flexibility of the insulating coating is not sufficiently increased. When this amount is larger than 40% by mole, the effect of the use of the aromatic diisocyanate compound (I) is suppressed so that the insulating coating is easily damaged.

When raw material contains 1 to 15% by mole of a polycarboxylic acid having at least 3 carboxyl group or a polyisocyanate compound having at least 3 isocyanate group, a crosslinking degree of the polyamideimide is increased so that a hardness and a heat-softening property of the insulating coating are improved. When the amount of the polycarboxylic acid or the polyisocyanate compound is less than 1% by mole, the above effects are insufficiently achieved. When this amount is larger than 15% by mole, the flexibility of the polyamideimide is deteriorated.

Preferred examples of the polycarboxylic acid are pyromellitic acid, trimellitic acid, butanetetracarboxylic acid, biphenyltetracarboxylic acid, benzophenonetetracarboxylic acid, diphenylsulfonetetracarboxylic acid, and the like. Preferred examples of the polyisocyanate compound are triphenylmethanetriisocyanate, diphenylethertriisocyanate, a polyisocyanate of a trimer of a diisocyanate compound (e.g. Desmodule L and Desmodule AP manufactured by Sumitomo Bayer Urethane Co., Ltd.), polymethylenepolyphenylisocyanate, and the like. In view of easy synthesis, the aromatic polycarboxylic acid is preferred.

To prepare the polyamideimide paint to be used according to the present invention, substantially stoichiometric amounts of the diisocyanate component and the acid component are polymerized in a suitable organic solvent in the same manner as in the preparation of the conventional polyamideimide. For example, the diisocyanate component containing the specific amount of the aromatic diisocyanate compound (I) is reacted with a substantially equimolar amount of the acid component, that is, 0.90 to 1.10 moles, preferably 0.95 to 1.05 moles of the acid component is reacted with one mole of the diisocyanate component, in the organic solvent at a temperature of 0° to 180° C. for 1 to 24 hours, whereby the polyamideimide paint comprising the polyamideimide dissolved or dispersed in the organic solvent is obtained.

Alternatively, the polyamideimide paint to be used according to the present invention can be prepared by mixing a polyamideimide paint which is prepared by polymerizing the aromatic diisocyanate compound (I) and the acid component and a polyamideimide paint which is prepared by polymerizing a diisocyanate compound other than the aromatic diisocyanate compound (I) and the acid component so that the amount of the aromatic diisocyanate compound (I) is from 10 to 80% by mole based on the whole amount of the diisocyanate component.

In the second aspect of the present invention in which the polyamideimide is prepared by a two-step reaction comprising reacting the diamine component with the acid component to obtain an imidodicarboxylic acid and then reacting the imidodicarboxylic acid with the diisocyanate component, the following combinations of the aromatic diisocyanate compound (I) and the aromatic diamine compound (II) are possible:

(1) The diamine component contains the aromatic diamine compound (II), while the diisocyanate component does not contain the aromatic diisocyanate compound (I).
(2) The diisocyanate component contains the aromatic diisocyanate compound (I), while the diamine component does not contain the aromatic diamine compound (II).
(3) The diamine component contains the aromatic diamine compound (II), and the diisocyanate component contains the aromatic diisocyanate compound (I).

Specific examples of the aromatic diamine compound (II) are benzidine, 3-methyl-4,4'-diaminobiphenyl, 3,3'-dimethyl-4,4'-diaminobiphenyl, 2,3'-dimethyl-4,4'-diaminobiphenyl, 2,2'-dimethyl-4,4'-diaminobiphenyl, 3,3'-dimethyl-3,4'-diaminobiphenyl, 3,3'-dimethyl-3,3'-diaminobiphenyl, 3,3'-diethyl-4,4'-diaminobiphenyl, 3,3'-dimethoxy-4,4'-diaminobiphenyl, 3,3'-diethoxy-4,4'-diaminobiphenyl, 3,3'-dichloro-4,4'-diaminobiphenyl, 3,3'-dibromo-4,4'-diaminobiphenyl, and the like. They may be used independently or as a mixture thereof.

Among the aromatic diamine compound, 3,3'-dimethyl-4,4'-diaminobiphenyl is preferred in view of easy availability and cost.

As the diamine compound which is other than the aromatic diamine compound (II), any of the conventionally used diamine may be used. Examples of the other diamine compound are 4,4'-diaminodiphenylether, 3,4'-diaminodiphenylether, 3,3'-diaminodiphenylether, 4,4'-diaminodiphenylmethane, 4,4'-diaminodiphenylsulfone, 4,4'-diaminodiphenylsulfide, 4,4'-diaminodibenzophenone, 4,4'-diaminodiphenylpropane, 4,4'-diaminodiphenylhexafluoropropane, 4,4'-[bis(4-aminophenoxy)]biphenyl, 4,4'-[bis(4-aminophenoxy)]diphenylether, 4,4'-[bis(4-aminophenoxy)]diphenylsulfone, 4,4'-[bis(4-aminophenoxy)]diphenylpropane, 4,4'-[bis(4-aminophenoxy)]diphenylmethane, 4,4'-[bis(4-aminophenoxy)]diphenylhexafluoropropane, and the like. They may be used independently or as a mixture thereof.

Among the diamine compound, 4,4'-diaminodiphenylether and 4,4-diaminodiphenylmethane are preferred in view of the strength of the insulating coating.

As the diisocyanate component, the above described diisocyanate compound including the aromatic diisocyanate compound (I) can be used.

The reason why the total amount of the aromatic diamine compound (II) and the aromatic diisocyanate compound (I) is from 10 to 80% by weight based on the total weight of the whole diisocyanate component and the whole diamine component is as follows:

When the total amount of the aromatic diamine compound (II) and the aromatic diisocyanate compound (I) is smaller than 10% by mole, the mechanical strength of the insulating coating is not improved. When this total amount exceeds 80% by mole, the insulating coating becomes brittle.

When the total amount of the aromatic diamine compound (II) and the aromatic diisocyanate compound (I) is from 30 to 70% by mole, abrasion resistance of the insulating coating is improved so that flaws are suppressed during wiring the insulated wire to form the coil using a winding machine. In particular, when the above total amount of the aromatic diamine compound (II) and the diisocyanate compound (I) is from 40 to 60% by mole, the abrasion resistance is further improved and the flaws are further suppressed.

When the total amount of the aromatic diamine compound (II) and the aromatic diisocyanate compound (I) is from 60 to 80% by mole based on the total amount of the whole diamine component and the whole diisocyanate component, at least one of the acid component, the diamine component and the diisocyanate component contains 5 to 40% mole, preferably 10 to 30% by mole of an acid or diisocyanate compound having a crooked molecular structure.

As the acid or diisocyanate compound having the crooked molecular structure, the above exemplified compound is used.

Examples of the diamine compound having the crooked molecular structure are aromatic diamines having no amine groups at the p-positions such as 3,4'- or 3,3'-diaminodiphenylmethane, 3,4'- or 3,3'-diaminodiphenylether, 3,4'- or 3,3'-diaminodiphenylsulfone, metaphenylenediamine, etc., and aliphatic diamines such as hexamethylenediamine, etc.

When the material contains 1 to 15% by mole of a polycarboxylic acid having at least 3 carboxyl group or a polyamine having at least 3 amine group or a polyisocyanate compound having at least 3 isocyanate group, a crosslinking degree of the polyamideimide is increased so that a hardness and a heat-softening property of the insulating coating are improved. When the amount of the polycarboxylic acid, the polyamine or the polyisocyanate compound is less than 1% by mole, the above effects are insufficiently achieved. When this amount is larger than 15% by mole, the flexibility of the polyamideimide is deteriorated.

As the polycarboxylic acid and the polyisocyanate compound, those exemplified above may be used.

Preferred examples of the polyamine are diphenylmethanetriamine, phenylenetriamine, diethyltriamine, triethylenetetramine and the like.

To prepare the polyamideimide paint to be used according to the second aspect of the present invention, substantially stoichiometric amounts of the diamine component and the acid component are reacted in a suitable organic solvent to obtain the imidodicarboxylic acid and the imidodicarboxylic acid is polymerized with a substantially stoichiometric amount of the diisocyanate compound in the same manners as in the preparation of the conventional polyamide imide.

For example, the diamine component is reacted with about twice the molar amount of the acid component in the organic solvent at a temperature of 0° to 150° C. for 1 to 24 hours, whereby the imidodicarboxylic acid is obtained. Then, the imidodicarboxylic acid is reacted with a substantially equimolar amount of the diisocyanate component, that is, 0.90 to 1.10 moles, preferably 0.95 to 1.05 moles of the diisocyanate component is reacted with the imidodicarboxylic acid, in the organic solvent at a temperature of 0° to 150° C. for 1 to 24 hours to obtain the polyamideimide dissolved or dispersed in the organic solvent.

Alternatively, the polyamideimide paint to be used according to the present invention can be prepared by mixing a polyamideimide paint which is prepared using the aromatic diamine compound (II) and/or the aromatic diisocyanate compound (I) in the above defined amount with a polyamideimide paint which is prepared by using the aromatic diamine compound (II) and/or the aromatic diisocyanate compound (I) in an amount outside the above defined amount range. In this case, a composition of the mixture is so adjusted the total amount of the aromatic diamine compound (II) and the aromatic diisocyanate compound (I) is from 10 to 80% by mole based on the total amount of the diamine component and the diisocyanate component.

If desired, the polyamideimide base paint to be used according to the present invention may contain any of conventionally used additives such as a pigment, a dye, an organic or inorganic filler, a lubricant and the like.

The polyamideimide base paint is coated on the conductor and then baked to produce the insulated wire of the present invention. The coating and baking conditions may be the same as those in the conventional method for producing the insulated wire having the conventional polyamideimide insulating coating.

A thickness of the insulating coating of the polyamideimide according to the present invention is not limited and may be the same thickness as the conventional insulated wire and selected according to a diameter of the conductor or the actual use of the insulated wire.

The insulating coating may be formed directly on the bare conductor, or on other insulating coating which is formed on the conductor.

The other insulating coating acts as a primer coating. The primer coating is preferably made of a material which has good adhesion both to the insulating coating of the polyamideimide of the present invention and the conductor.

As the primer coating material, any of the conventionally used insulating materials such as polyurethane, polyester, polyesterimide, polyesteramideimide, polyamideimide which is different from the above polyamideimide of the present invention, polyimide, and the like may be used. Among them, a polyamideimide comprising diphenylmethane-4,4'-diisocyanate and trimellitic anhydride, the polyesterimide and the polyester are preferred in view of the adhesion to the conductor and the polyamideimide coating of the present invention, heat resistance and the mechanical strength of the coating.

A thickness of the primer coating is not critical. In view of the mechanical strength of the coating, a ratio of the thickness of the polyamideimide insulating coating of the present invention to that of the primer coating is preferably from 1:10 to 10:1.

When the polyamideimide base paint is directly coated on the conductor and baked, a top coating may be formed on the polyamideimide base coating of the present invention. As the top coating material, any of the conventionally used material-, such as polyurethane, polyester, polyesterimide, polyesteramideimide, polyamideimide which is polyimide, and the like may be used.

In addition, over the top coating, a surface-lubricating layer may be provided to impart the lubricity to the surface of the insulated wire.

As the surface-lubricating layer, though a coating film of a paraffin such as a liquid paraffin, solid paraffin, etc. may be used, a surface lubricating layer formed by binding a lubricant such as a wax, polyethylene, a fluoro-resin or a silicone resin with a binder resin is preferably used.

When the insulated wire of the present invention has a coefficient of static friction of 0.10 or less, the abrasion resistance is greatly improved and generation of the flaws of the insulating layer after the winding is significantly suppressed.

When a bonding strength between a conductor and the coating layer is at least 30 g/mm, the abrasion resistance is greatly improved and generation of the flaws of the insulating layer after the winding is significantly suppressed.

When the insulated wire of the present invention has a coefficient of static friction 0.10 or less and the bonding strength between a conductor and the coating layer is at least 30 g/mm, the abrasion resistance is more greatly improved and generation of the flaws of the insulating layer after the winding is more effectively suppressed.

Preferred Embodiments of the Invention

The present invention will be illustrated by the following examples.

EXAMPLE 1

In a flask equipped with a thermometer, a condenser, a calcium chloride-filled tube, a stirrer and a nitrogen-introducing tube, 108.6 g of trimellitic anhydride (hereinafter referred to as "TMA"), 29.9 g of 3,3'dimethyl-biphenyl-4,4'-diisocyanate (hereinafter referred to as "TODI") and 113.1 g of-diphenylmethane-4,4'-diisocyanate (hereinafter referred to as "MDI") were charged while introducing nitrogen gas at a flow rate of 150 ml/min. through the nitrogen-introducing tube. An amount of TODI was 20% by mole based on the whole amount of the diisocyanate component.

Then, 637 g of N-methyl-2-pyrrolidone was added to the mixture in the flask and heated at 80° C. for 3 hours while stirring. After heating up to 140° C. in three hours, the mixture was heated at 140° C. for one hour. Thereafter, the heating was stopped and the mixture was cooled to obtain a polyamideimide paint having a concentration of 25%.

The polyamideimide paint was coated on a peripheral surface of a copper conductor having a diameter of 1.0 mm and baked by a conventional method to produce an insulated wire having an insulating coating with a thickness of 35 $\mu$m.

EXAMPLE 2

In the same manner as in Example 1 except that 59.7 g of TODI and 84.8 g of MDI were used so that an amount of TODI was 40% by mole based on the whole amount of the diisocyanate component, an insulated wire was produced.

EXAMPLE 3

In the same manner as in Example 1 except that 74.7 g of TODI and 70.7 g of MDI were used so that an amount of TODI was 50% by mole based on the whole amount of the diisocyanate component, an insulated wire was produced.

EXAMPLE 4

In the same manner as in Example 1 except that 89.6 g of TODI and 56.6 g of MDI were used so that an amount of TODI was 60% by mole based on the whole amount of the diisocyanate component, an insulated wire was produced.

EXAMPLE 5

In the same manner as in Example 1 except that 112.0 g of TODI and 35.3 g of MDI were used so that an amount of TODI was 75% by mole based on the whole amount of the diisocyanate component, an insulated wire was produced.

COMPARATIVE EXAMPLE 1

In the same manner as in Example 1 except that no TODI and 141.4 g of MDI were used, an insulated wire was produced.

COMPARATIVE EXAMPLE 2

In the same manner as in Example 1 except that 149.3 g TODI and no MDI were used, an insulated wire was produced.

EXAMPLE 6

On a peripheral surface of a copper conductor having a diameter of 1.0 mm, a commercially available polyamideimide paint containing diphenyl-4,4'-diisocyanate and TMA (HI-400 (trade name) manufactured by Hitachi Chemical Co., Ltd.) was coated and baked by the conventional method to form a primer coating with a thickness of 17 $\mu$m.

Over the primer coating, the polyamideimide paint prepared in Example 3 was coated and baked to produce an insulated wire having an insulating coating with a thickness of 18 $\mu$m.

The produced insulated wires were subjected to the following tests:

Appearance

Appearance of the insulated wire is observed and evaluated with naked eyes.

Modulus of Elasticity

From the insulated wire, the conductor is removed by etching and the remaining insulating coating is tested using a tensile tester with a chuck distance of 3 cm at a pulling rate of 1 mm/min. From an S-S curve, a modulus of elasticity (kg/mm$^2$) is calculated.

Flexibility Test

The insulated wire is bent around each of plural rods having a diameter increasing from 1 mm by 1 mm and cracks and/or peeling of the coating are observed. A minimum diameter d (mm) at which neither crack nor peeling is observed is recorded.

Quick-Elongation Breakage Test

The insulated wire having a length of 100 cm is drawn at a rate of 20 cm/sec. and broken. Then, a broken part is observed and a floating distance (mm) between the conductor surface and the peeled insulating coating is measured.

Damage Test Under Stainless Steel Wire Loading

The insulated wire and a stainless steel wire are perpendicularly crossed and the music wire is pulled under varying load, and the minimum load at which the insulating coating is flawed is recorded.

One-Direction Abrasion

Abrasion resistance is measured according to JIS C-3003.

Reciprocal Abrasion

The insulated wire and a bead needle are perpendicularly crossed and the bead needle is reciprocated. The number of reciprocation of the bead needle at which a short circuit is formed between the insulated wire and the bead needle is recorded.

Leakage Current After Winding

The insulated wire is wound in a coil form using a winding machine which is actually used for winding a wire. Then, the wound wire and a counter electrode are immersed in a 3% saline, and a voltage of 3 V is applied between the coil and the counter electrode with the coil being a negative electrode to measure a leakage current, whereby an extent of the flaw which reaches the conductor is evaluated.

The above results are shown in Table 1.

TABLE 1

| Example No. | TODI amount (mol %) | Appearance | Modulus of elasticity (kg/mm$^2$) | Flexibility d (mm) | Floating distance (mm) | Minimum load (kg) | One-way abrasion (g) | Reciprocal abrasion (times) | Leakage current (mA) |
|---|---|---|---|---|---|---|---|---|---|
| C. 1 | 0 | Good | 210 | 1 | 1.5 | 7.0 | 1325 | 813 | 62 |
| 1 | 20 | Good | 250 | 1 | 1.6 | 7.5 | 1390 | 847 | 51 |
| 2 | 40 | Good | 270 | 1 | 1.9 | 8.0 | 1585 | 871 | 36 |
| 3 | 50 | Good | 310 | 1 | 2.2 | 8.5 | 1714 | 880 | 27 |
| 4 | 60 | Good | 330 | 1 | 2.5 | 8.5 | 1721 | 833 | 33 |
| 5 | 75 | Good | 360 | 2 | 2.8 | 9.0 | 1706 | 602 | 45 |
| C. 2 | 100 | Turbid | 400 | 5 | 3.6 | 9.0 | 1732 | 418 | 58 |
| 6 | 50 | Good | 290 | 1 | 1.5 | 8.5 | 1730 | 885 | 20 |

From the results in Table 1, it is understood that, in the insulated wire of Comparative Example 1 having the insulating coating comprising no TODI, the insulating coating had the low modulus of elasticity and was easily flawed from the result of the damage test under stainless steel wire loading. On the other hand, the insulated wire of Comparative Example 2 having the insulating coating comprising 100% of TODI had poor flexibility as seen from the result of the flexibility test and the insulating coating was easily peeled off from the conductor as seen from the result of the quick-elongation breakage test.

On the contrary, the insulated wires of Examples 1-6 were hardly flawed and excellent in flexibility, and the insulating coatings were hardly peeled off from the conductors. From the above results, it is understood that, as the ratio of TODI in the diisocyanate component increased, the modulus of elasticity was increased, and the insulating coating was more difficultly flawed, while the flexibility and the adhesion to the conductor of the insulating coatings increased as the ratio of TODI in the diisocyanate component decreased. In view of the balance among these properties, a ratio of TODI is preferably from 30 to 60% by mole of the whole diisocyanate component as seen from Examples 2, 3 and 4.

With each of the insulated wires of Example 3 and Comparative Example 1, a dielectric breakdown voltage was measured according to the method described in JIS C-3003 "Test methods of enameled copper wires and enameled aluminum wires".

The results are as follows:

| Example No. | Dielectric breakdown voltage |
|---|---|
| Example 3 | 13.0-15.5 V (14.7) |
| Comp. Ex. 1 | 13.2-15.9 V (14.9) |

The numerals in the brackets are averaged values of the data.

From these results, it is understood that the insulated wire of the present invention has the same voltage resistance as the conventional insulated wire of Comparative Example 1.

EXAMPLE 7

The polyamideimide paint which was prepared in Comparative Example 1 and comprised MDI only as the diisocyanate component and the polyamideimide paint which was prepared in Comparative Example 2 and comprised TODI only as the diisocyanate component were mixed so that a molar ratio of TODI to MDI was 20:80 and well stirred. Then, using this mixed paint, an insulated wire was produced in the same manner as in Example 1.

EXAMPLE 8

In the same manner as in Example 7 except that two paints were mixed so that a molar ratio of TODI to MDI was 50:50, an insulated wire was produced.

EXAMPLE 9

In the same manner as in Example 7 except that two paints were mixed so that a molar ratio of TODI to MDI was 75:25, an insulated wire was produced.

The properties of the insulated wires produced in Examples 7, 8 and 9 were measured in the same manners as in the previous Examples.

The results are shown in Table 2.

TABLE 2

| Example No. | TODI amount (mol %) | Appearance | Modulus of elasticity (kg/mm$^2$) | Flexibility d (mm) | Floating distance (mm) | Minimum load (kg) | One-way abrasion (g) | Reciprocal abrasion (times) | Leakage current (mA) |
|---|---|---|---|---|---|---|---|---|---|
| 7 | 20 | Good | 250 | 1 | 1.5 | 7.5 | 1358 | 821 | 53 |
| 8 | 50 | Good | 290 | 1 | 2.2 | 8.0 | 1693 | 876 | 34 |
| 9 | 75 | Good | 330 | 1 | 2.9 | 8.5 | 1659 | 589 | 50 |

From the results of Table 2, it is understood that the insulated wires of Examples 7, 8 and 9 had substantially the same properties as those of Examples 1, 3 and 5 (see Table 1). Therefore, the mixture of the coating paint comprising TODI and one comprising no TODI had the same effects as the coating paint prepared by copolymerization.

EXAMPLE 10

In the same manner as in Example 1 except that 135.8 g of TODI and 42.9 g of MDI were used so that an amount of TODI was 75% by mole based on the whole amount of the diisocyanate component and, as the acid component, a mixture of 127.7 g of TMA and 3.7 g of isophthalic acid (hereinafter referred to as "IPA") was used so that an amount of IPA was 3% by mole based on the whole amount of the acid components, an insulated wire was produced.

EXAMPLE 11

In the same manner as in Example 10 except that 105.3 g of TMA and 22.8 g of IPA were used so that an amount of IPA was 20% by mole based on the whole amount of the acid component, an insulated wire was produced.

EXAMPLE 12

In the same manner as in Example 10 except that 72.4 g of TMA and 51.2 g of IPA were used so that an amount of IPA was 45% by mole based on the whole amount of the acid component, an insulated wire was produced.

The properties of the insulated wires produced in Examples 10, 11 and 12 were measured in the same manners as in the previous Examples.

The results are shown in Table 3.

EXAMPLE 15

In the same manner as in Example 13 except that 86.9 g of TMA and 15.8 g of ETM were used so that an amount of ETM was 12.9% by mole based on the whole amount of the acid component, an insulated wire was produced.

The properties of the insulated wires produced in Examples 13, 14 and 15 were measured in the same manners as in the previous Examples.

In addition, a softening point was measured according to JIS C-3003.

The results are shown in Table 4.

TABLE 4

| Example No. | ETM amount (mol %) | Appearance | Modulus of elasticity (kg/mm$^2$) | Flexibility d (mm) | Floating distance (mm) | Minimum load (kg) | One-way abrasion (g) | Reciprocal abrasion (times) | Leakage current (mA) | Softening point (°C.) |
|---|---|---|---|---|---|---|---|---|---|---|
| 3 | 0 | Good | 310 | 1 | 2.2 | 8.5 | 1714 | 880 | 27 | 385 |
| 13 | 3.4 | Good | 312 | 1 | 2.3 | 8.5 | 1720 | 883 | 20 | 403 |
| 14 | 6.9 | Good | 312 | 2 | 2.3 | 8.5 | 1723 | 876 | 22 | 410 |
| 15 | 12.9 | Good | 313 | 3 | 2.3 | 8.5 | 1716 | 878 | 28 | 422 |

From the results of Table 4, it is understood that the addition of ETM as the acid component increased the softening point of the insulating coating, though the

TABLE 3

| Example No. | IPA amount (mol %) | Appearance | Modulus of elasticity (kg/mm$^2$) | Flexibility d (mm) | Floating distance (mm) | Minimum load (kg) | One-way abrasion (g) | Reciprocal abrasion (times) | Leakage current (mA) |
|---|---|---|---|---|---|---|---|---|---|
| 5 | 0 | Good | 360 | 2 | 2.8 | 9.0 | 1706 | 602 | 45 |
| 10 | 3 | Good | 360 | 2 | 3.5 | 9.0 | 1715 | 705 | 39 |
| 11 | 20 | Good | 350 | 1 | 2.8 | 9.0 | 1725 | 806 | 34 |
| 12 | 45 | Good | 270 | 1 | 2.0 | 8.0 | 1708 | 742 | 37 |

From the results of Table 3, it is understood that the insulating coatings comprising IPA had substantially the same properties as those comprising no IPA. When the amount of IPA was from 3 to 45% by mole of the whole amount of the acid component, the modulus of elasticity and flexibility of the insulating coatings were improved with maintaining other properties unchanged.

When the amount of IPA was 3% by mole, the properties were not materially changed, while when the amount of IPA was 45% by mole, the insulated coating tended to be flawed slightly easily. In view of the balance of the properties, the insulating coating of Example 11 was preferred.

Example 13

In the same manner as in Example 1 except that 74.7 g of TODI and 70.7 g of MDI were used so that an amount of TODI was 50% by mole based on the whole amount of the diisocyanate component and, as the acid component, a mixture of 103.2 g of TMA and 4.0 g of trimellitic acid (hereinafter referred to as "ETM") was used so that an amount of ETM was 3.4% by mole based on the whole amount of the acid components, an insulated wire was produced.

EXAMPLE 14

In the same manner as in Example 13 except that 97.8 g of TMA and 7.9 g of ETM were used so that an amount of ETM was 6.9% by mole based on the whole amount of the acid component, an insulated wire was produced.

flexibility was slightly deteriorated. Then, a preferred range of the amount of ETM was from 1 to 10% by mole of the whole acid component.

COMPARATIVE EXAMPLE 3

On a peripheral surface of a copper conductor having a diameter of 1.0 mm, a commercially available polyesterimide base paint (ISOMID 40-SH (trade name) manufactured by Nisshoku Skenectady Co., Ltd.) was coated and baked by the conventional method to form a primer coating with a thickness of 26 μm.

Over the primer coating, the same polyamideimide paint as used in Comparative Example 1 was coated and baked to produce an insulated wire having an insulating coating with a thickness of 9 μm.

EXAMPLE 16

On a peripheral surface of a copper conductor having a diameter of 1.0 mm, a commercially available polyesterimide base paint (ISOMID 40-SH (trade name) manufactured by Nisshoku Skenectady Co., Ltd.) was coated and baked by the conventional method to form a primer coating with a thickness of 26 μm.

Over the primer coating, the same polyamideimide paint as used in Example 3 was coated and baked to produce an insulated wire having an insulating coating with a thickness of 9 μm.

EXAMPLE 17

On a peripheral surface of a copper conductor having a diameter of 1.0 mm, the same polyamideimide paint as used in Example 3 was coated and baked by the conventional method to form a primer coating with a thickness of 26 μm.

Over the primer coating, the same polyamideimide paint as used in Comparative Example 1 was coated and baked to produce an insulated wire having an overcoat layer with a thickness of 9 μm.

COMPARATIVE EXAMPLE 4

On a peripheral surface of a copper conductor having a diameter of 1.0 mm, the same polyamideimide paint as used in Comparative Example 1 was coated and baked by the conventional method to form a primer coating with a thickness of 26 μm.

Over the primer coating, a polyesterimide base paint (ISOMID 40-SH (trade name) manufactured by Nisshoku Skenectady Co., Ltd.) was coated and baked by the conventional method to form a overcoat layer with a thickness of 9 μm.

EXAMPLE 18

On a peripheral surface of a copper conductor having a diameter of 1.0 mm, the same polyamideimide paint as used in Example 3 was coated and baked by the conventional method to form a primer coating with a thickness of 26 μm.

Over the primer coating, a commercially available polyesterimide base paint (ISOMID 40-SH (trade name) manufactured by Nisshoku Skenectady Co., Ltd.) was coated and baked by the conventional method to form an overcoat layer with a thickness of 10 μm.

The properties of the insulated wires produced in Examples 16, 17 and 18 and Comparative Examples 3 and 4 were measured in the same manners as in the previous Examples.

The results are shown in Table 5.

TABLE 5

| Example No. | Structure Primer | Structure Overcoat | Appearance | Modulus of elasticity (kg/mm$^2$) | Flexibility d (mm) | Floating distance (mm) | Minimum load (kg) | One-way abrasion (g) |
| --- | --- | --- | --- | --- | --- | --- | --- | --- |
| C. 3 | Polyester-imide | Polyamide-imide of C. 1 | Good | 203 | 1 | 1.7 | 6.0 | 1180 |
| 16 | ↑ | Polyamide-imide of E. 3 | Good | 231 | 1 | 1.7 | 6.5 | 1252 |
| C. 1 | Polyamide-imide of E. 3 | — | Good | 210 | 1 | 1.5 | 7.0 | 1325 |
| 17 | Polyamide-imide of E. 3 | Polyamide-imide of C. 1 | Good | 235 | 1 | 2.3 | 7.5 | 1395 |
| C. 4 | Polyamide-imide of C. 1 | Polyester-imide | Good | 207 | 1 | 1.5 | 6.0 | 1078 |
| 18 | Polyamide-imide of E. 3 | Polyester-imide | Good | 232 | 1 | 2.2 | 6.5 | 1155 |

From the results of Table 5, it is understood that, the use of the polyamideimide of Example 3 improved the resistance to the damage test under stainless steel; and wire loading and the one-way abrasion without deteriorating other properties in comparison with the polyamideimide of Comparative Example 1.

EXAMPLE 19

In the same manner as in Example 6 except that, over the surface of the insulated wire produced in Example 6, a baking type water-soluble lubricant paint (TEC-9601 (trade name) manufactured by Toshiba Chemical Co., Ltd.) was coated and baked by the conventional manner to form a lubricating layer, an insulated wire was produced.

EXAMPLE 20

In the same manner as in Example 6 except that a commercially available polyamideimide paint with good adhesion to the conductor (HI-406A (trade name) manufactured by Hitachi Chemical Co., Ltd.) as the polyamideimide paint, an insulated wire was produced.

Example 21

In the same manner as in Example 19 except that, over the surface of the insulated wire produced in Example 19, a baking type water-soluble lubricant paint (TEC-9601 (trade name) manufactured by Toshiba Chemical Co., Ltd.) was coated and baked by the conventional manner to form a lubricating layer, an insulated wire was produced.

The same properties as above and also an adhesion force of the insulating coating to the conductor and a coefficient of static friction against a stainless steel wire were measured.

The adhesion force and the coefficient of static friction against the stainless steel wire are measured as follows:

Adhesion Force

Along a length of the insulating coating, two cut lines each having a length of 2 cm are made at a distance of 0.5 mm and an edge of the insulating coating between the two cut lines is peeled off with a forceps. Then, it is subjected to the 180° peeling test between the insulating coating and the conductor using a thermal-mechanical analyzer (TMA) (THERMAL-MECHANICAL ANALYSIS manufactured by Seiko Electronics Co., Ltd.) to measure an adhesion force (g/mm).

Coefficient of Static Friction Against Stainless Steel Wire

The insulated wire and the stainless steel wire are perpendicularly crossed and a load of 1 kg is applied at one end of the stainless steel wire. Then, a coefficient of static friction is measured.

The results are shown in Table 6.

TABLE 6

| Example No. | Coefficient of static friction | Adhesion force (g/mm) | Appearance | Modulus of elasticity (kg/mm$^2$) | Flexibility d (mm) | Minimum load (kg) | One-way abrasion (g) | Reciprocal abrasion (times) | Leakage current (mA) |
| --- | --- | --- | --- | --- | --- | --- | --- | --- | --- |
| 6 | 0.15 | 25 | Good | 290 | 1 | 8.5 | 1730 | 885 | 20 |

TABLE 6-continued

| Example No. | Coefficient of static friction | Adhesion force (g/mm) | Appearance | Modulus of elasticity (kg/mm²) | Flexibility d (mm) | Minimum load (kg) | One-way abrasion (g) | Reciprocal abrasion (times) | Leakage current (mA) |
|---|---|---|---|---|---|---|---|---|---|
| 19 | 0.08 | 25 | Good | 290 | 1 | 9.5 | 1830 | 906 | 15 |
| 20 | 0.15 | 45 | Good | 285 | 1 | 9.5 | 1815 | 891 | 16 |
| 21 | 0.08 | 45 | Good | 285 | 1 | 10.0 | 1877 | 938 | 10 |

EXAMPLE 22

In a flask equipped with a thermometer, a condenser, a calcium chloride-filled tube, a stirrer and a nitrogen-introducing tube, 0.5 mole of TMA and 0.25 mole of 3,3'-dimethyl-4,4'-diaminobiphenyl (hereinafter referred to as "DBRB") were charged while introducing nitrogen gas at a flow rate of 150 ml/min. through the nitrogen-introducing tube.

Then, 762 g of N-methyl-2-pyrrolidone was added to the mixture in the flask and heated at 80° C. for 2 hours while stirring to form an imidodicarboxylic acid.

To the resulting reaction mixture, 0.25 mole of MDI was added and heated at 80° C. for 2 hours, at 140° C. for 2 hours and then at 180° C. for 2 hours while stirring. Thereafter, the heating was stopped and the mixture was cooled to obtain a polyamideimide paint having a concentration of 25%.

In the same manner as in Example 1 but using the above prepared polyamideimide paint, an insulated wire was produced.

An amount of DBRB was 50% by mole based on the total amount of the diamine component and the diisocyanate component.

EXAMPLE 23

In the same manner as in Example 22 except that 0.125 mole of DBRB, 0.125 mole of diaminodiphenylether (hereinafter referred to as "DDE"), 0.125 mole of MDI and 0.125 mole of TODI were used, an insulated wire was produced.

COMPARATIVE EXAMPLE 5

In the same manner as in Example 22 except that no DBRB and 0.25 mole of diaminodiphenylmethane (hereinafter referred to as "DDM") were used, an insulated wire was produced.

COMPARATIVE EXAMPLE 6

In the same manner as in Example 22 except that no MDI and 0.25 mole of TODI were used, an insulated wire was produced.

The properties of the insulated wires produced in Examples 22 and 23 and Comparative Examples 5 and 6 were measured in the same manners as in the previous Examples.

The results are shown in Table 7.

What is claimed is:

1. An insulated wire comprising a conductor and an insulating coating made from a polyamideimide base coating, which polyamideimide comprises an acid component and a diisocyanate component containing 10 to 80% by mole of an aromatic diisocyanate compound based on the whole amount of the diisocyanate component of the formula:

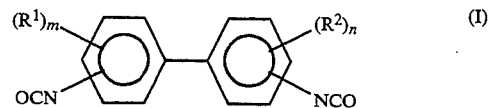

wherein $R^1$ and $R^2$ are the same or different and each is a hydrogen atom, an alkyl group, an alkoxy group or a halogen atom, and m and n are the same or different and each represents a number from 1 to 4.

2. The insulated wire according to claim 1, wherein the amount of said aromatic diisocyanate compound (I) is from 30 to 70% by mole based on the whole amount of the diisocyanate component.

3. The insulated wire according to claim 1, wherein the amount of said aromatic diisocyanate compound (I) is from 40 to 60% by mole based on the whole amount of the diisocyanate component.

4. The insulated wire according to claim 1, wherein said diisocyanate component further contains an aromatic diisocyanate compound of the formula:

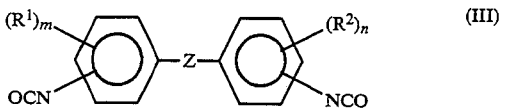

wherein $R^1$, $R^2$, m and n are as defined in claim 1, and Z is $—CH_2—$ or $—O—$.

5. The insulated wire according to claim 1, wherein said acid component comprises an acid anhydride of the formula:

TABLE 7

| Example No. | DBRB | TODI | DBRB + TODI | Appearance | Modulus of elasticity (kg/mm²) | Flexibility d (mm) | Floating distance (mm) | Minimum load (kg) | One-way abrasion (g) | Reciprocal abrasion (times) | Leakage current (mA) |
|---|---|---|---|---|---|---|---|---|---|---|---|
| | (mol %)*¹ | | | | | | | | | | |
| C. 5 | 0 | 0 | 0 | Good | 200 | 1 | 1.7 | 7.0 | 1260 | 782 | 64 |
| 22 | 50 | 0 | 50 | Good | 300 | 1 | 2.5 | 8.5 | 1613 | 859 | 33 |
| 23 | 25 | 25 | 50 | Good | 305 | 1 | 2.4 | 8.5 | 1650 | 863 | 33 |
| C. 6 | 50 | 50 | 100 | Turbid | 380 | 6 | 3.8 | 9.0 | 1583 | 767 | 58 |

Note:
*¹A mole percentage based on the total amount of the diamine component and the diisocyanate component.

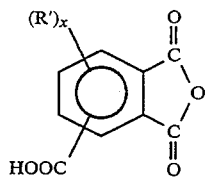

(IV)

wherein R' is a hydrogen atom, an alkyl group, an alkoxy group or a halogen atom and x is a number from 1 to 3.

6. The insulated wire according to claim 1, wherein the amount of the aromatic diisocyanate compound (I) is from 60 to 80% by mole based on the whole amount of the diisocyanate component, and at least one of the acid component and the diisocyanate component contains 5 to 40% by mole of a compound having a crooked molecular structure.

7. The insulated wire according to claim 6, wherein the acid component contains 5 to 40% by mole of an acid compound having a crooked molecular structure.

8. The insulated wire according to claim 7, wherein said acid compound having the crooked molecular structure is an aromatic o- or m-dicarboxylic acid.

9. The insulated wire according to claim 1, wherein said acid component contains 1 to 15% by mole of a polycarboxylic acid, and/or said diisocyanate component contains 1 to 15% by mole of a polyisocyanate comprising triisocyanate or higher polyisocyanate.

10. The insulated wire according to claim 9, wherein said acid component contains 1 to 15% by mole of an aromatic tricarboxylic acid.

11. The insulated wire according to claim 1, wherein said polyamideimide is prepared by copolymerizing said aromatic diisocyanate compound (I), at least one other diisocyanate and the acid component.

12. The insulated wire according to claim 1, which further comprises a primer coating between the conductor and the polyamideimide base coating.

13. The insulated wire according to claim 12, wherein said primer coating is formed by coating a paint comprising a polyamideimide of diphenylmethane-4,4'-diisocyanate and trimellitic anhydride and baking the coated paint.

14. The insulated wire according to claim 12, wherein said primer coating is formed by coating a polyesterimide or polyester paint on the conductor and baking the coated paint.

15. The insulated wire according to claim 1, which further comprises a lubricating layer on said insulating coating and which has a coefficient of static friction of 0.10 or less.

16. The insulated wire according to claim 1, wherein the bonding strength between the conductor and said insulating coating is at least 30 g/mm.

* * * * *